United States Patent [19]

Buchanan

[11] Patent Number: 5,058,327
[45] Date of Patent: Oct. 22, 1991

[54] TUBING AND FITTING STRIPPER

[76] Inventor: John Buchanan, 78 Annuskemunnica Rd., Babylon, N.Y. 11702

[21] Appl. No.: 557,465

[22] Filed: Jul. 25, 1990

[51] Int. Cl.[5] ............................................. B25F 1/00
[52] U.S. Cl. ............................ 51/181 NT; 51/205 R; 7/157; 7/100; 15/104.03
[58] Field of Search .......... 51/181 R, 181 NT, 205 R, 51/205 WG, 393, 394; 7/157, 100, 167; 15/104.03, 104.04, 104.05

[56] References Cited

U.S. PATENT DOCUMENTS

| | | | |
|---|---|---|---|
| 1,620,262 | 3/1927 | Klaboe | 7/167 |
| 1,710,127 | 4/1929 | Vaughn | 7/100 |
| 3,168,799 | 2/1965 | Johnson | 51/205 R |
| 3,266,075 | 8/1966 | Conrad | 15/104.03 |
| 4,038,715 | 8/1977 | Litt | 15/104.03 |
| 4,899,409 | 2/1990 | Cox, Jr. | 7/157 |

FOREIGN PATENT DOCUMENTS 0945087  4/1949  France ............................. 7/100

Primary Examiner—Robert A. Rose
Attorney, Agent, or Firm—Richard L. Miller

[57] ABSTRACT

A tubing and fitting stripper is provided and consists of a T shaped housing carrying three different sized wire bristle sleeves in each leg so that an end of a copper tubing of a matching size to one of the wire bristles sleeves can fit therein allowing the outer surface of the end of the copper tubing to be cleaned when the housing rotates thereabout. A cone shaped wire brush extends from the housing opposite from the center leg so that the cone shaped wire brush can fit into a recessed opening to cleaned when the housing rotates thereabout. A protective sleeve is removably attached to the housing over the cone shaped wire brush so that an end of a copper tubing can fit into the sleeve onto the cone shaped sleeve allowing the inner surface of the end of the copper tubing to be cleaned when the housing rotates thereabout while the protective sleeve is kept in place attached to said housing.

4 Claims, 1 Drawing Sheet

U.S. Patent    Oct. 22, 1991    5,058,327
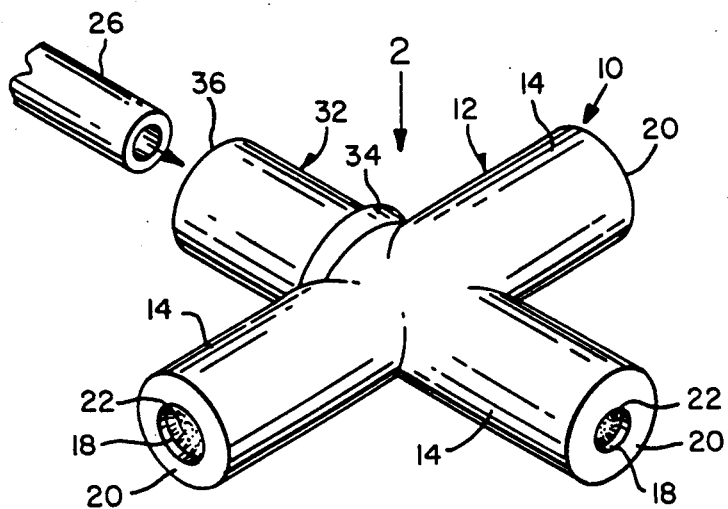
FIG. 1
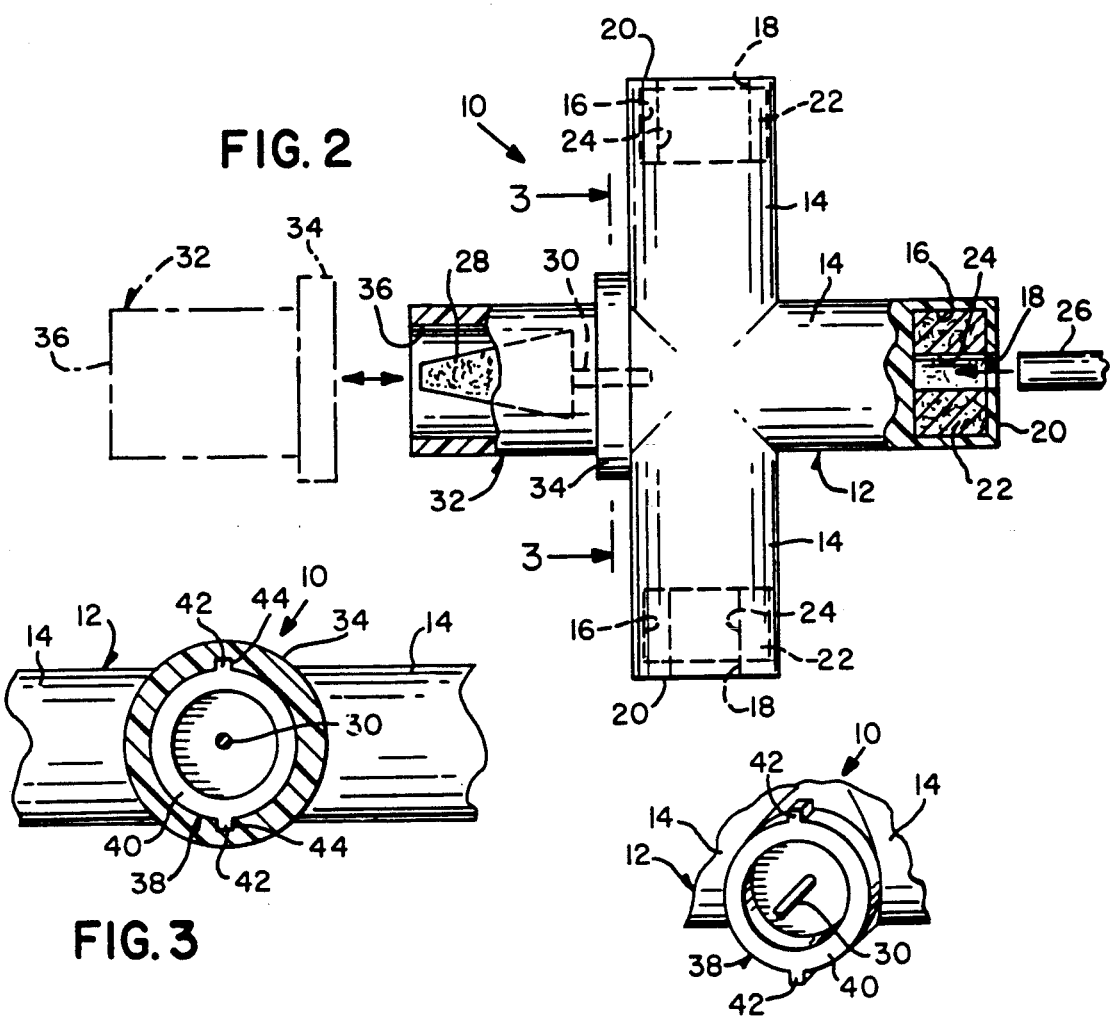
FIG. 2
FIG. 3
FIG. 4

TUBING AND FITTING STRIPPER

BACKGROUND OF THE INVENTION

The instant invention relates generally to pipe and bolt cleaning tools and more specifically it relates to a tubing and fitting stripper.

Numerous pipe and bolt cleaning tools have been provided in the prior art that are adapted to include brushes for removing rust, corrosion and other foreign matter from pipe ends and bolts. For example, U.S. Pat. Nos 2,404,507 to Link; 4,133,070 to Litt and 4,433,448 to True all are illustrative of such prior art. While these units may be suitable for the particular purpose to which they address, they would not be as suitable for the purpose of the present invention as hereafter described.

SUMMARY OF THE INVENTION

A primary object of the present invention is to provide a tubing and fitting stripper that will overcome the shortcomings of the prior art devices.

Another object is to provide tubing and fitting stripper that is so constructed that it can clean the outer surfaces of various sized copper tubing ends.

An additional object is to provide a tubing and fitting stripper that is so constructed that it can clean the inner surfaces of various sized copper tubing end and recessed openings such as a battery cable clamp fitting.

A further object is to provide a tubing and fitting stripper that is simple and easy to use.

A still further object is to provide a tubing and fitting stripper that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention;

FIG. 2 is a top view as taken in direction of arrow 2 in FIG. 1, with parts in section and the protective sleeve shown removed in phantom;

FIG. 3 is a cross sectional view taken along line 3—3 in FIG. 2 showing .the positioning members therein; and FIG. 4 is a perspective view with parts broken away illustrating in greater detail the positional members.

DETAILED DESCRIPTION OF THE PREFERRED EMBODIMENTS

Turning now descriptively to the drawings, in which like reference characters denote like elements throughout the several views, FIG. 1 through 4 illustrate a tubing and fitting stripper 10 consisting of T-shaped housing 12 in which each leg 14 of the housing 12 has a chamber 16 with a bore 18 at its distal end 20 being of a different diameter size from the other bores 18. A wire bristle sleeve 22 is carried in each of the chambers 16 and has an aperture 24 which matches with the respective bore 18. An end of a copper tubing 26 of matching size can fit therein allowing the outer surface of the end of the copper tubing 26 to be cleaned when the respective leg 14 rotates thereabout. A cone shaped wire brush 28 has a spine 30 extending from the housing 12 opposite from the center leg 14. The cone shaped wire brush 28 can fit into a recessed opening such as a battery cable clamp fitting (not shown), allowing the recessed opening to be cleaned when the housing 12 rotates thereabout.

A protective sleeve 32 as shown in FIG. 2, has an annular flange 34 at one end and an opening 36 at the other end. A structure 38 is provided for removably attaching the annular flange 34 of the protective sleeve 32 to the housing 12 over the cone shaped wire brush 28. An end of a copper tubing 26 can fit into the opening 36 in the protective sleeve 32 onto the cone shaped wire brush 28 allowing the inner surface of the end of the copper tubing 26 to be cleaned when the housing 12 rotates thereabout.

The structure 38 includes a collar 40 having positioning members 42 thereon, in which the collar 40 is affixed to the housing 12 about the spine 30 of the cone shaped wire brush 28. The annular flange 34 on the protective sleeve 32 has internal notches 44. The annular flange 34 is of a size to fit onto the collar 40 with the positioning members 42 in engagement with the internal notches 44.

The T-shaped housing 12 and protective sleeve 32 are both fabricated typically out of high-strength durable plastic material. The T-shaped housing 12 will be a better torquing leverage than related conventional devices when the housing is rotated.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A tubing and fitting stripper comprising:

a) a housing having three leg portions with the first and second leg portions having a common central axis and the third leg portion having a central axis extending at a right angle to the common central axis of the first and second leg portion, The central axis of the third leg portion being coplanar with the common central axis of the first and second leg portions, in which each leg of said housing has a chamber with a bore at its distal end being of a different diameter size from the other said bores;

b) three wire bristles sleeves, each carried in one of the chambers and having an aperture which matches with the respective bore so that an end of a copper tubing of a matching size can fit therein allowing the outer surface of the end of the copper tubing to be cleaned when said respective leg portion rotates thereabout;

c) a cone shaped wire brush having a spine extending from said housing opposite from said third leg portion so that said cone shaped wire brush can fit into a recessed opening allowing the recessed opening to be cleaned when said housing rotates thereabout; and d) a protective sleeve having a central axis colinear with the central axis of the third leg portion which substantially prevents inadvertent contact between foreign objects and said cone shaped wire brush.

2. A tubing and fitting stripper as recited in claim 1, further including:
a) said protective sleeve having an annular flange at a fist end and an opening at a second end; and
b) means for removably attaching said annular flange of said protective sleeve to said housing over said cone shaped wire brush so that an end of a copper tubing can fit into the opening in said protective sleeve onto said cone shaped wire brush allowing the inner surface of the end of the copper tubing to be cleaned when said housing rotates thereabout while said protective sleeve is left in place.

3. A tubing and fitting stripper as recited in claim 2, wherein said removable attaching means includes:
a) a collar having at least one positioning member thereon in which said collar is affixed to said housing about said spine of said cone shaped wire brush; and
b) said annular flange on said protective sleeve having at least one internal notch in which said annular flange being of a size to fit onto said collar with said at least one positioning member in engagement with said at least one internal notch.

4. A tubing and fitting stripper as recited in claim 3, wherein said housing and said protective sleeve are both fabricated out high-strength durable plastic material whereby said housing will facilitate torquing leverage when said housing is rotated.

* * * * *